A. HAZELL.
MILK CARRYING TANK.
APPLICATION FILED DEC. 7, 1909.
968,152.
Patented Aug. 23, 1910.
2 SHEETS—SHEET 1.
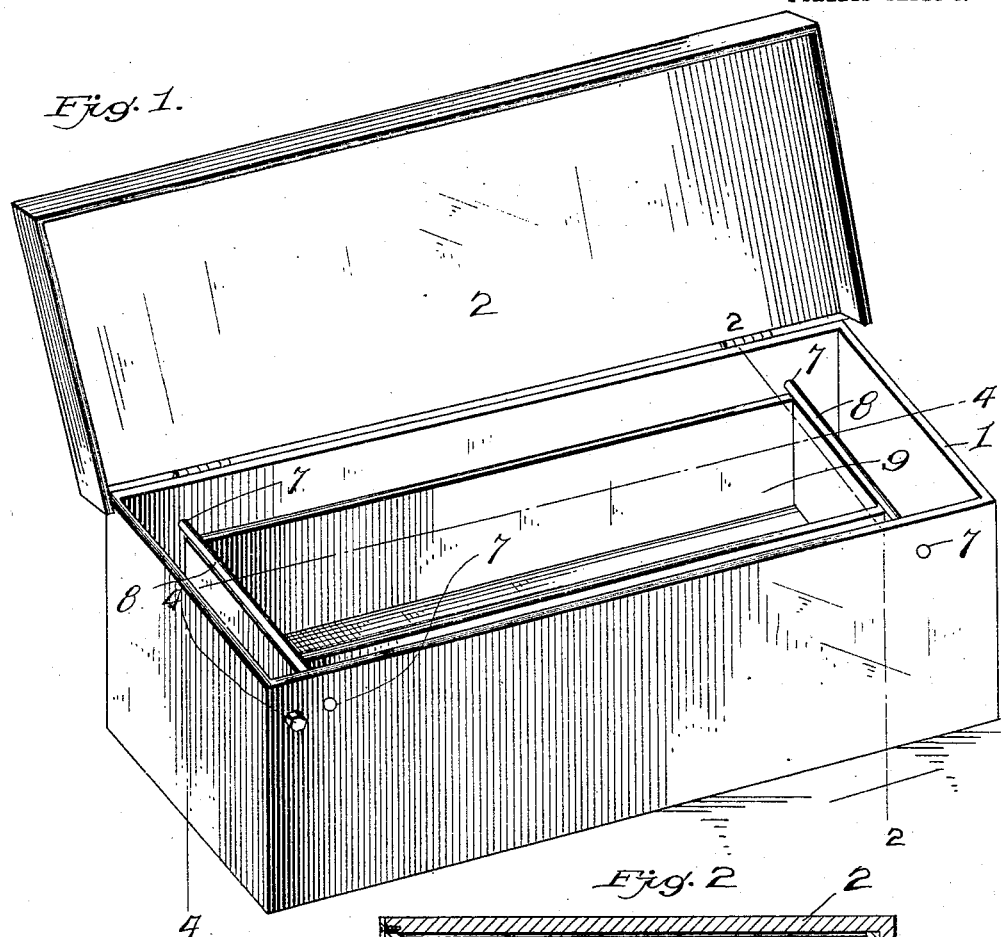
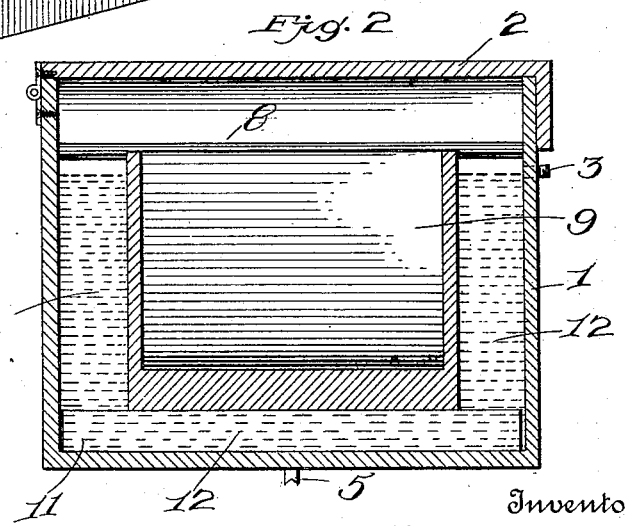
Witnesses
Inventor
Alice Hazell.

A. HAZELL.
MILK CARRYING TANK.
APPLICATION FILED DEC. 7, 1909.
968,152.
Patented Aug. 23, 1910.
2 SHEETS—SHEET 2.
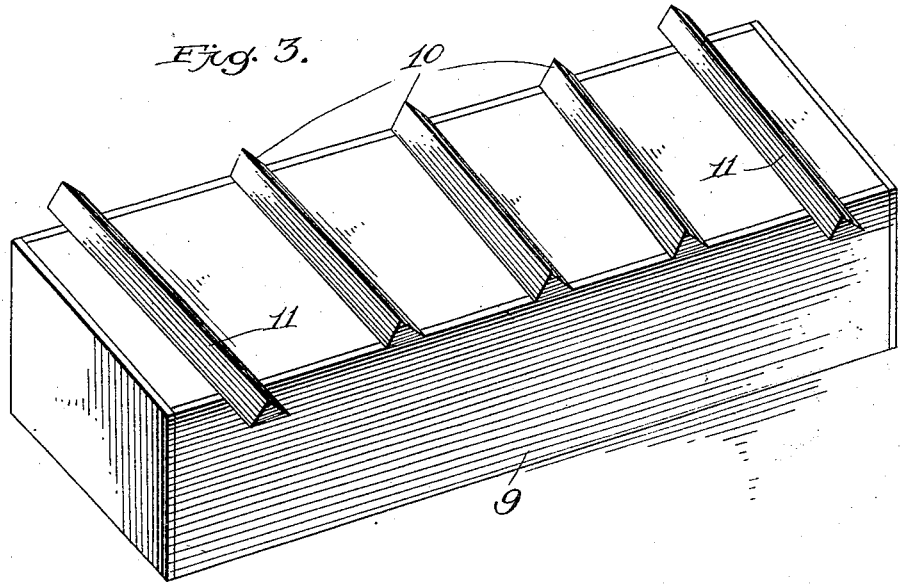
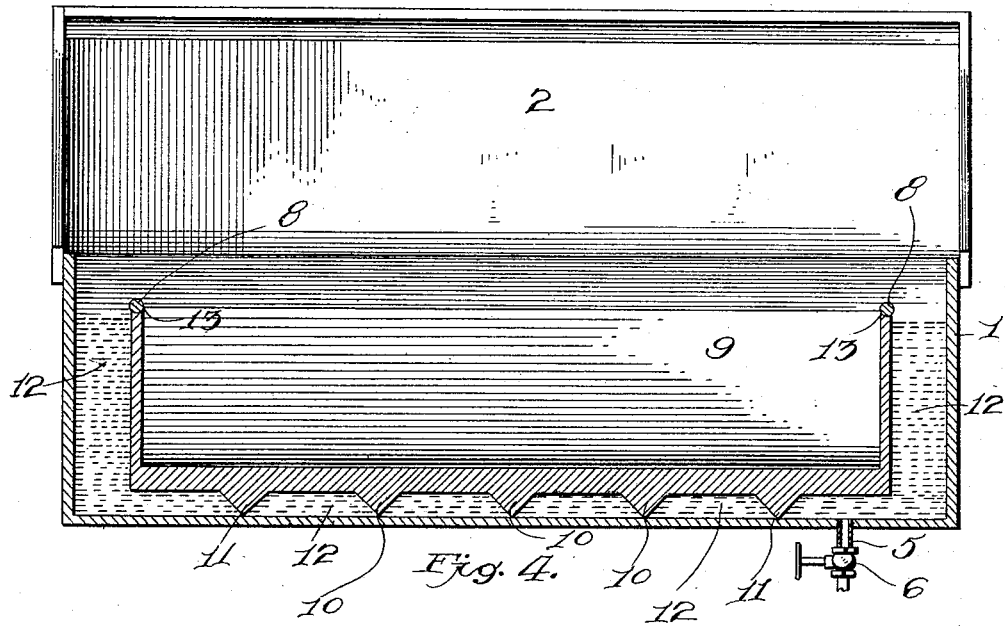
Witnesses
Inventor
Alice Hazell.
By E. E. Trooman
his Attorney

UNITED STATES PATENT OFFICE.

ALICE HAZELL, OF TURON, KANSAS.

MILK-CARRYING TANK.

968,152.  Specification of Letters Patent.  Patented Aug. 23, 1910.

Application filed December 7, 1909. Serial No. 531,752.

*To all whom it may concern:*

Be it known that I, ALICE HAZELL, a citizen of the United States of America, residing at Turon, in the county of Reno and State of Kansas, have invented certain new and useful Improvements in Milk-Carrying Tanks, of which the following is a specification, reference being had therein to the accompanying drawing.

This invention relates to milk cooling and settling tanks, and the principal object of the same is to provide a device of the character stated with a novel milk receptacle that may be partially submerged in a cooling liquid within the tank, means being provided for retaining the receptacle spaced from the tank so that the cooling liquid may surround the bottom, sides and ends thereof, and means also being provided for normally retaining the receptacle immovable relative to the tank.

In carrying out the objects of the invention generally stated above, it will be understood, of course, that the essential features thereof are necessarily susceptible of changes in details and structural arrangements, one preferred and practical embodiment of which is shown in the accompanying drawings, wherein:—

Figure 1 is a perspective view of the improved tank. Fig. 2 is a transverse vertical sectional view taken on the line 2—2, Fig. 1, the cover being shown closed. Fig. 3 is a bottom plan view of the milk receptacle. Fig. 4 is a vertical longitudinal sectional view taken on the line 4—4, Fig. 1. Fig. 5 is a fragmentary sectional view of one of the end walls of the milk receptacle, showing one of the holding rods engaged therewith.

Referring to the accompanying drawings by numerals, 1 designates the tank preferably formed of galvanized sheet metal and provided with a hinged cover 2. Said tank has a pipe 3 extending through the upper end portion of one side to permit cooling liquid to be poured into the tank when the cover thereof is closed, said pipe having its external end threaded for the reception of sealing cap 4. A drain pipe 5 extends through the bottom of the tank, said pipe being equipped with a controlling valve 6.

The tank 1 is preferably rectangular in shape and has each side provided with openings 7, said openings being located in opposite upper end portions of the sides. The openings of the sides are oppositely disposed, so that holding rods 8 may be transversely passed through the tank to hold the milk receptacle 9 therein. Said milk receptacle 9 is of the same shape as the tank 1 but smaller in size and has the outer surface of its bottom equipped with regularly spaced transverse ribs 10 that may be integral with said bottom. Said ribs are preferably of a triangular shape in cross section, and the intermediate ones are of the same length as the width of the bottom of the receptacle. The end ribs 11 project beyond the sides of said receptacle and contact with the sides of the tank, so that the sides of the receptacle will be retained in spaced relation when the receptacle is within the tank, and the bottom of the receptacle will be retained in spaced relation to the bottom of the tank by the ribs 10. Obviously, with the receptacle and tank in the described relative positions the cooling liquid 12 that is within the tank will surround the ends, sides and bottom of the receptacle so that the contents of the receptacle will be retained at the proper temperature to preserve the same.

The upper edge of the ends of the receptacle 9 are provided with a longitudinal groove 13 which form seats for the holding rods 8 of the tank so that by means of said rods, the receptacle is rigidly but detachably retained within the tank.

In assembling the invention the receptacle 9 is placed within the tank 1 with its end grooves 13 in alinement with openings 7, and the holding rods 8 are then forced through said opening and engage said grooves. Obviously a reversal of this operation will separate the parts of the invention.

The tank may be supplied with its cooling liquid before the receptacle 9 is placed therein, or the liquid may be supplied after the receptacle is in place and the cover 2 closed, by means of the pipe 3. And, when necessary or desirable, the liquid may be drained off through drain pipe 5. It will also be obvious that by placing supply pipe 3 in communication with a source of liquid supply and opening valve 6 of drain pipe 5, a constant circulation of cooling liquid through the tank and about the receptacle 9 may be obtained.

What I claim as my invention is:—

1. A device of the character described comprising a cooling tank, a receptacle fitted therein and provided with means on its bottom for spacing the same from the sides and bottom of said tank, and holding means slidable through said tank for retaining the receptacle therein.

2. A device of the character described comprising a tank having transverse openings formed through the upper end portions of its side, a receptacle therein and provided with end grooves that aline with said opening, and rods slidable through said openings and engaging said grooves to retain the receptacle within said tank.

In testimony whereof I hereunto affix my signature in presence of two witnesses.

ALICE HAZELL.

Witnesses:
M. H. POTTER,
C. E. SMITH.